US007887183B2

(12) United States Patent
Drobe et al.

(10) Patent No.: US 7,887,183 B2
(45) Date of Patent: Feb. 15, 2011

(54) METHOD FOR DETERMINING A PROGRESSIVE OPHTHALMIC LENS

(75) Inventors: Bjorn Drobe, Kerrisdale (SG); Claude Pedrono, Briis-Sous-Forges (FR)

(73) Assignee: Essilor International (Compagnie Générale d'Optique), Charenton Cedex (FR)

( * ) Notice: Subject to any disclaimer, the term of this patent is extended or adjusted under 35 U.S.C. 154(b) by 0 days.

(21) Appl. No.: 12/097,233

(22) PCT Filed: Dec. 12, 2006

(86) PCT No.: PCT/FR2006/002707

§ 371 (c)(1),
(2), (4) Date: Jan. 15, 2010

(87) PCT Pub. No.: WO2007/068818

PCT Pub. Date: Jun. 21, 2007

(65) Prior Publication Data

US 2010/0110373 A1    May 6, 2010

(30) Foreign Application Priority Data

Dec. 13, 2005    (FR) .................................. 05 12586

(51) Int. Cl.
G02C 7/06    (2006.01)
(52) U.S. Cl. ....................................... 351/177; 351/169
(58) Field of Classification Search ................ 351/169, 351/177
See application file for complete search history.

(56) References Cited

U.S. PATENT DOCUMENTS 5,270,745 A    12/1993    Pedrono
5,272,495 A    12/1993    Pedrono
5,488,442 A    1/1996    Harsigny et al.
5,861,935 A *    1/1999    Morris et al. ................ 351/169
6,318,859 B1    11/2001    Baudart et al.
6,382,789 B1    5/2002    Baudart et al.

(Continued)

FOREIGN PATENT DOCUMENTS

EP    0 990 939    4/2000

(Continued)

OTHER PUBLICATIONS

Stefanie Schuldt, "ysis—Naturliches Sehen erleben", *Doz Optometrie & Fashion*, vol. 59, No. 5, pp. 38-43 (May 3, 2004).

*Primary Examiner*—Scott J Sugarman
(74) *Attorney, Agent, or Firm*—Hensley, Kim & Holzer, LLC (57) ABSTRACT

A method for determining a progressive ophthalmic lens for a given user for whom a near vision power addition has been prescribed includes the following steps: measuring the user's downward and the vertical horopter on a near-vision target point; measuring the user's near-vision head elevation and/or eye elevation; determining a coefficient of the user's near-vision vertical head participation ($Ptv_{vp}$); determining a user-specific progressive length (LP) defined by the relationship LP=H (1−$Ptv_{yp}$), the progressive length being defined as the downward look angle between the mounting cross and the meridian point for which the power achieves the power addition; determining the lens by optimizing in optical computation in worn conditions, using as target a power variation along the meridian with a progressive length equal to said user-specific progressive length.

10 Claims, 7 Drawing Sheets

| Wearer | A | B | C | D |
|---|---|---|---|---|
| PFV | 0 | 0 | 0 | 0 |
| Add (diopters) | 2 | 2 | 2 | 2 |
| Horopter (°) | 87.5 | 65 | 87.5 | 65 |
| Ptv | 0.6 | 0.6 | 0.703 | 0.4615 |
| Pev | 0.4 | 0.4 | 0.297 | 0.5385 |
| PL (°) | 35 | 26 | 26 | 35 |

U.S. PATENT DOCUMENTS

| | | |
|---|---|---|
| 7,066,597 B2 * | 6/2006 | Miller et al. ................ 351/169 |
| 7,249,850 B2 | 7/2007 | Donetti et al. |
| 2003/0107707 A1 | 6/2003 | Fisher et al. |
| 2008/0106697 A1 | 5/2008 | Pedrono |

FOREIGN PATENT DOCUMENTS

| | | |
|---|---|---|
| FR | 2 683 642 | 5/1993 |
| FR | 2 683 643 | 5/1993 |
| FR | 2 699 294 | 6/1994 |
| FR | 2 704 327 | 10/1994 |
| FR | 2 858 693 | 2/2005 |
| FR | 2 874 709 | 3/2006 |
| GB | 2 277 997 | 11/1994 |
| WO | WO 98/12590 | 3/1998 |

* cited by examiner

| Wearer | A | B | C | D |
|---|---|---|---|---|
| PFV | 0 | 0 | 0 | 0 |
| Add (diopters) | 2 | 2 | 2 | 2 |
| Horopter (°) | 87.5 | 65 | 87.5 | 65 |
| Ptv | 0.6 | 0.6 | 0.703 | 0.4615 |
| Pev | 0.4 | 0.4 | 0.297 | 0.5385 |
| PL (°) | 35 | 26 | 26 | 35 |

Fig 8a Prior Art

Fig 8b Wearer A

Fig 8c Wearer B

Fig 8d Wearer C

Fig 8e Wearer D

METHOD FOR DETERMINING A PROGRESSIVE OPHTHALMIC LENS

CROSS-REFERENCE TO RELATED APPLICATIONS

This application is the National Stage of International Application No. PCT/FR2006/002707, filed on Dec. 12, 2006, which claims the priority to French Patent Applications Ser. No. 05 12 586, filed on Dec. 13, 2005. The contents of all applications are hereby incorporated by reference in their entireties.

FIELD OF INVENTION

A subject of the present invention is a method for determining a progressive ophthalmic lens; in particular a personalized progressive lens for the specific needs of a given wearer.

BACKGROUND

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and with the position of the wearer's eyes relative to the frame.

SUMMARY

For presbyopic wearers, the value of the power correction is different for far vision and near vision, due to the difficulties of accommodation in near vision. The prescription thus comprises a far-vision power value and an addition (or power progression) representing the power increment between far vision and near vision; this comes down to a far-vision power prescription and a near-vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327.

Progressive multifocal ophthalmic lenses include a far-vision zone, a near-vision zone, an intermediate-vision zone, a principal progression meridian crossing these three zones. They are generally determined by optimization, based on a certain number of constraints imposed on the different characteristics of the lens. Most lenses marketed are all-purpose lenses, in that they are suitable for wearers' different day-to-day needs.

Families of progressive multifocal lenses are defined, each lens of a family being characterized by an addition which corresponds to the power variation between the far-vision zone and the near-vision zone. More precisely, the addition, referenced A, corresponds to the power variation between a point FV of the far-vision zone and a point NV of the near-vision zone, which are respectively called far-vision control point and near-vision control point, and which represent the points of intersection of the view with the surface of the lens for far distance vision and for reading vision.

In a standard fashion, a lens also has a fitting cross FC. This is a point marked on the surface of the lens and which is used by the optician when fitting the lens in the frame. The fitting cross FC corresponds to the point of intersection of the front face of the lens with the primary direction of viewing of the wearer. For a progressive ophthalmic lens, a progression length PL is also defined as the vertical distance between the fitting cross FC, and a point of the meridian on which the power progression reaches the power A.

Lenses with the same addition differ by the value of the mean sphere at a reference point, also called a base. Usually, the base of a lens is linked to the curvature of a face of the lens and is given by the expression $(n-1)/R$ where n is the refractive index and R the radius of curvature expressed in meters; the mean power depends on the curvature of the other face of the lens. It is possible to choose for example to measure the base at the far-vision control point FV. Thus the choice of a pair (addition, base) defines a group or set of aspherical front faces for progressive multifocal lenses. Generally, it is thus possible to define 5 base values and 12 addition values, i.e. sixty front faces. In each of the bases an optimization is carried out for a given power. Starting from semi-finished lenses, of which only one face is formed, this known method makes it possible to prepare lenses suited to most wearers, by simple machining of a spherical or toric other face.

Thus, progressive multifocal lenses generally comprise a complex aspherical face, which can be the front face opposite to the wearer of the spectacles, and a spherical or toric face, which can be the rear face directed towards the wearer of the spectacles. This spherical or toric face allows the lens to be adapted to the user's ametropia, so that a progressive multifocal lens is generally defined only by its complex aspherical surface. As is well known, an aspherical surface is generally defined by the altitude of all of its points. The parameters constituted by the minimum and maximum curvatures at each point are also used, or more commonly their half-sum and their difference. This half-sum and this difference multiplied by a factor $n-1$, n being the refractive index of the lens material, are called mean sphere and cylinder. A progressive multifocal lens can thus be defined, at every point on its complex surface, by geometric characteristics comprising a mean sphere value and a cylinder value. The complex surface of the lens can be situated on the front face or on the rear face or distributed between the two faces, depending on the machining techniques used.

Moreover, a progressive multifocal lens can also be defined by optical characteristics taking into account the situation of the wearer of the lenses. In fact, the laws of the optics of ray tracings lead to the appearance of optical defects when the rays deviate from the central axis of any lens. Conventionally, the aberrations known as power defects and astigmatism defects are considered. These optical aberrations can be generically called obliquity defects of rays.

Obliquity defects of rays have already been clearly identified in the prior art and improvements have been proposed. For example, the document WO-A-98 12590 describes a method for determination by optimization of a set of progressive multifocal ophthalmic lenses. This document proposes defining the set of lenses by considering the optical characteristics of the lenses and in particular the wearer power and oblique astigmatism, under the wearing conditions. The lens is optimized by ray tracing, using an ergorama associating a target object point with each direction of viewing under the wearing conditions.

EP-A-0 990 939 also proposes to determine a lens by optimization taking into account the optical characteristics instead of the surface characteristics of the lens. For this purpose the characteristics of an average wearer are considered, in particular with regard to the position of the lens in front of the wearer's eye in terms of curving contour, pantoscopic angle and lens-eye distance.

It has been found that each wearer has a different lens-eye behaviour. Recently therefore it has been sought to personalize progressive ophthalmic lenses in order to best satisfy the needs of each wearer.

For example, for the definition of progressive lenses it is proposed, in particular by ZEISS and RODENSTOCK under the references Zeiss Individual and Impression ILT respectively, to take account of the real position of the lens in front of the wearer's eye. For this purpose, measurements of the position of the lens in the frame chosen by the wearer are carried out. Firstly, measuring the position of the lens relative to the wearer's eye is difficult to carry out accurately. Then, optimization is carried out for a measured position of the lens in front of the wearer's eye; as it turns out that the position of the frame varies over time and cannot be considered as constant for a given wearer. As a result of these two factors, allowance for the position of the lens does not appear to give the wearer additional comfort compared with solutions which consider only the mean position of the lens.

Under the trade mark VARILUX IPSEO, the applicant markets a range of progressive lenses, which are defined in relation to the wearer's head-eye behaviour. This definition is based on the fact that any wearer, to view different points at a given height in the object space, can move either his head or his eyes and that the viewing strategy of a wearer is based on a combination of head and eye movements. The wearer's viewing strategy influences the perceived width of the fields on the lens. Thus, the more the wearer's lateral vision strategy involves a movement of the head, the narrower the zone of the lens scanned by the wearer's vision is. If the wearer moved only his head in order to look at different points at a given height of the object space, his view would still pass through the same point of the lens. The product VARILUX IPSEO therefore proposes different lenses, for the same ametropia-addition pair, as a function of the wearer's lateral vision strategy.

With the same philosophy of personalizing progressive ophthalmic lenses to the specific needs of each wearer, the French patent application filed by the Applicants under the title "*Method for determination of a pair of progressive ophthalmic lenses*" on 27 Aug. 2004 under number 04 09 144 proposes to take account of the near-vision sagittal plane shift of the wearer for the determination of the optical characteristics of progressive lenses.

The company RUPP & HUBRACH has moreover proposed, under the reference Ysis, to measure the inclination of the head during a near-vision task in order to determine the choice between four proposed progression lengths. This measurement however does not fully take account of the head-eye behaviour, as it does not take account of the full lowering of view which can be defined as the sum of lowering the eyes in their sockets and inclining the head.

Measurements carried out in the Applicant's laboratories show that favouring the lowering of view during a near-vision task varies significantly from one individual to another. This lowering appears to be a response to seeking an optimal visual comfort depending on the physiological and visual characteristics specific to each individual.

Therefore there is still a need for a lens which better satisfies the specific needs of each individual wearer.

Therefore, the invention proposes to take account of the preferred near-vision lowering of view for a given individual and to determine the participation of the head in this lowering with respect to the participation of the eyes in order to design progressive lenses personalized to the needs of the wearer. The wearer can thus maintain a natural posture while maintaining visual comfort.

More particularly, the invention proposes a method for determining a progressive ophthalmic lens for a given wearer for whom a near-vision power addition (A) has been prescribed, the lens having a fitting cross marking the primary direction of view under wearing conditions and a principal progression meridian between a zone of far vision and a zone of near vision, the method comprising the steps of:

measuring the lowering of view (V) of the wearer on a near-vision point aimed at;

measuring a near-vision vertical horopter (H) of the wearer as the angle made by the lowering of view (V) with a document containing the point aimed at, said document forming an angle (B) with the horizontal;

measuring the elevation of the head (Hd) and/or the elevation of the eyes (E) of the wearer in near vision;

determination of a vertical coefficient of participation of the head in near vision ($Ptv_{nv}$) defined as the ratio of the elevation of the head (Hd) to the lowering of view (V), $Ptv_{nv}=Hd/(V+B)$;

determination of a progression length (PL) specific to the wearer defined by the relationship $PL=H(1-Ptv_{nv})$, the progression length being defined as the angle of lowering of the eyes between the fitting cross (FC) and the point of the meridian for which the power reaches the power addition (A);

determination of the lens by optimisation by optical calculation under wearing conditions, using as target a power variation along the meridian with a progression length equal to said progression length specific to the wearer.

According to a feature, the step of measuring the lowering of view (V) comprises the steps of:

positioning the wearer reading a document in near vision;

measuring the average angle by which the head is lowered to scan the document and/or measuring the average angle by which the eyes are lowered to scan the document;

identification of the point aimed at by the wearer;

measuring the angle formed between a horizontal plane of the space and the plane containing the point aimed at and the centres of rotation of the eyes.

According to a feature, the step of measuring the lowering of view and the step of measuring the vertical horopter are combined, the document containing the point aimed at by the wearer being positioned flat on a horizontal support.

The invention also proposes a progressive ophthalmic lens personalized to the needs of a given wearer, the lens having a fitting cross (FC) marking the primary direction of view under wearing conditions and an approximately umbilical progression meridian having a power addition (A) between a far-vision (FV) control point and a near vision (NV) control point; the lens having under wearing conditions, an optical power controlled along the meridian with a progression length defined as the vertical distance between the fitting cross (FC) and the point of the meridian for which the power reaches the addition (A), said progression length of said personalized lens being determined by the following relationship: $PL=H(1-Ptv_{nv})$; with H, the vertical horopter of said wearer in near-vision and $Ptv_{nv}$, the vertical coefficient of participation of the head of said wearer in near-vision.

According to embodiments, the progression meridian has a zero derivative for a lowering of view of said wearer comprised between 85° and 90°; or the optical power along the progression meridian increases beyond the near-vision reference point for a lowering of view of said wearer less than 85°.

The invention also relates to a visual device comprising at least one lens according to the invention and a method for correcting the vision of a presbyopic subject, which comprises providing the subject with, or the wearing by the subject of, such a device.

BRIEF DESCRIPTION OF THE DRAWINGS

Other advantages and characteristics of the invention will become apparent on reading the following description of the embodiments of the invention, given by way of example and with reference to the drawings which show.

DETAILED DESCRIPTION

The invention proposes a method of determination of a progressive ophthalmic lens for a presbyopic wearer, i.e. for which a power addition A has been prescribed for near vision.

In a manner known per se, a progressive lens has a far-vision zone with a control point FV, a near-vision zone with a control point NV and an intermediate-vision zone. A principal progression meridian crosses these three zones. The meridian therefore has a power progression between the far-vision control point FV and the near-vision control point NV; this progression corresponds approximately to the value of the prescribed addition A. A fitting cross FC is marked by a reference point on the complex surface and constitutes an aid for fitting the cut-out lens into the frame; this fitting cross FC makes it possible to locate on the lens the primary direction of viewing under wearing conditions. In this context, progression length PL refers to the vertical distance between the fitting cross FC and the point of the meridian in near-vision NV at which the power progression reaches the prescribed power A.

The progression length PL defines the accessibility to the necessary near-vision powers. In fact, the meridian profile represents the wearer power as a function of lowering the eyes in the eye sockets with a direction of viewing which is straight ahead. Thus, according to the value of the progression length, the wearer will have to lower his eyes more or less in order to be able to take full advantage of the near-vision zone. In certain cases, this accessibility to the near-vision zone can be made available at the expense of holding the head in a far from natural position.

The present invention proposes to take into account the preferred near-vision lowering of view for a given wearer, and more specifically the participation of the head in this lowering in relation to that of the eyes, for designing progressive ophthalmic lenses suitable for each individual so that the latter can derive the full benefit from correction of his presbyopia without effort, in a natural posture and while maintaining visual comfort. It is now possible to take account of such individual parameters in large-scale manufacturing, thanks to methods for direct machining of the complex surfaces constituting the progressive lenses.

The Applicant has noted that each individual adopts a posture enabling maximum near-vision visual comfort. In particular, the individual inclines his document or changes the elevation of his eyes and head if the document is placed on a support, in such a way as to make it coincide with his vertical horopter. The vertical horopter for a given fixation point is defined here as the location of the vertical lines perceived in binocular vision as single and vertical.

Figure 1:
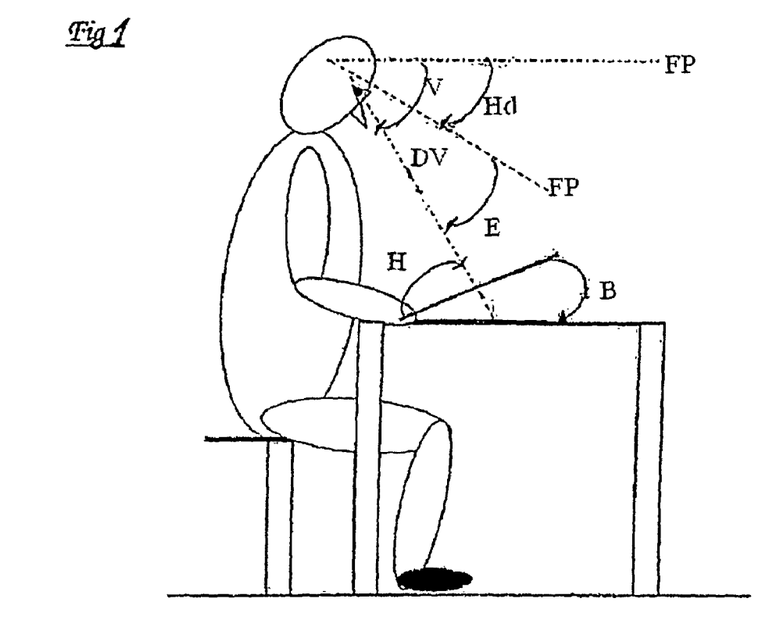
FIG. 1, a diagram of a subject in an environment requiring the use of near vision.

FIG. 1 diagrammatically shows a wearer in a document-reading environment, i.e. in which the wearer makes use of near vision. The method according to the invention proposes to measure the wearer's near-vision vertical horopter, i.e. the angle made by the direction of viewing with the document containing the point aimed at, as well as the lowering of view and the elevation of the head in near vision, and to determine a vertical coefficient of participation of the head in near-vision in order to determine a progression length specifically suited to the needs of this wearer. The vertical coefficient of participation of the head is defined as the ratio of the elevation of the head to the lowering of view. The calculation of this coefficient will be detailed below.

The Applicant's experimental observations have shown that in order to explore his environment an individual uses coordinated movements to move his head and eyes to a greater or lesser extent. The head movements are characterised within a reference linked to the space originating at the centre of rotation of the head. The eye movements are characterised within references connected to the head and originating at the centre of rotation of each of the two eyes. The direction of view $D_V$ is characterized with respect to a reference plane linked to the head and called the Frankfurt plane. A definition of the Frankfurt plane is given in patent applications FR-A-2 683 642 and FR-A-2 683 643; the Frankfurt plane FP is the plane passing through the lower border of the eye sockets and through the tragion of the ears of the wearer. The direction of view DV is a straight line belonging to a plane containing the point aimed at and the centres of rotation of the eyes.

In far vision, with a point aimed at straight in front at infinity, the direction of view is horizontal. In the natural position, for this far-vision direction of the view, the Frankfurt plane is horizontal; the amplitude of vertical movements of the eyes and head is therefore considered to be zero.

When the wearer abandons a far-vision target point to view a near-vision target point, he lowers his eyes and head in respectively differing proportions according to the individual.

In this context, the elevation of the head is defined as the angle Hd formed by the Frankfurt plane FP with a horizontal plane of the space and the elevation of the eyes—or ocular elevation—is defined as the angle E formed by the direction of view DV with the Frankfurt plane FP. The elevation values of the eyes or the head are therefore downward movements and are expressed with negative angle values. The lowering of view V is therefore carried out by an elevation of the head Hd and by an elevation of the eyes. More specifically V=Hd+E.

The lowering of view V is therefore the angle formed between the horizontal plane of the space and the direction of view DV.

Figure 2:
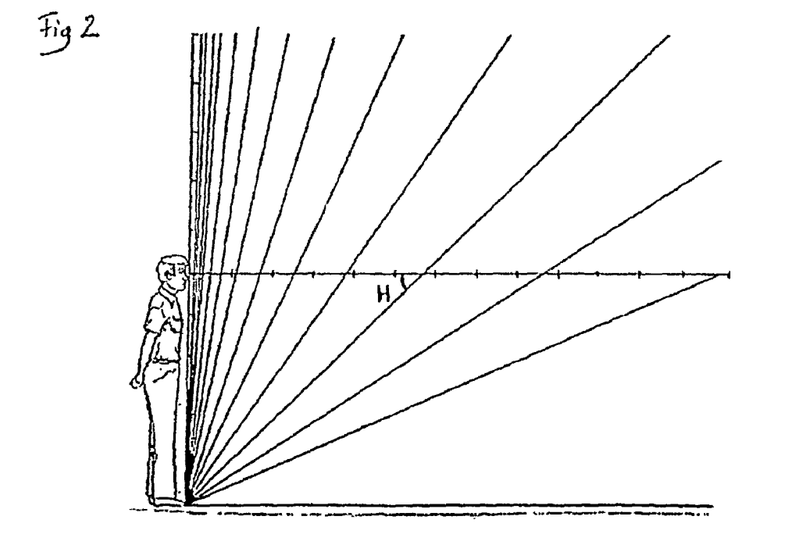
FIG. 2, a diagram showing the variation of the vertical horopter as a function of the target distance for a given subject.

Close to the fixation point, the vertical horopter can be similar to a part of the plane more or less tilted at an angle H with respect to the direction of viewing DV. Due to muscular balance, the lowering of the eyes in near vision, combined with convergence, results in a twisting of the eyeballs which changes the vertical and horizontal references of the visual system. The vertical horopter H therefore varies with the elevation of the eyes E. FIG. 2, taken from the manual "Vergence eye movements: Basic & clinical aspects", by Clifton M. Schor and Kenneth J. Ciuffreda, p 557, published in 1983, shows that the vertical horopter H, for a given subject, varies with the target distance.

The near-vision vertical horopter is a variable which varies from one individual to another as a function of morphological, physiological and behavioural parameters; on the other hand for a given distance, the horopter is approximately constant for a given individual. Thus, each individual will position and/or incline his document at an angle B so that the document forms an angle close to his vertical horopter with the direction of view DV. Hereinafter, it will be assumed that the document is placed flat on a horizontal support, i.e. that the angle B is zero. The vertical horopter H and the near-vision direction of view will therefore have the same angular value.

Most progressive ophthalmic lenses on the market are known as general-purpose and are calculated to satisfy the needs of the majority. For product ranges offering only one progression length, an average lowering of view and an average elevation of the eyes have been retained as standard values. For product ranges offering several progression lengths, the prescribing practitioner can choose that which best corresponds to the preferred ocular elevation of the wearer, but without taking account of the specific value of the near-vision vertical horopter of the wearer.

The method of the invention proposes to measure by suitable means the near-vision posture of each wearer, in particular the lowering of view V onto a near-vision point aimed at, the near-vision vertical horopter H and the preferred elevation of the head Hd for a near-vision task.

These variables can be added to other personalization variables already known, such as the sagittal plane shift or the horizontal shift, to be used as input data for an optical optimization program which makes it possible to calculate the complex surfaces of progressive ophthalmic lenses, such as in particular the programs described in WO-A-98 12590 or FR-A-2 858 693.

In particular, the invention proposes to supply a progressive ophthalmic lens which has a power progression along the meridian specifically adapted to the needs of the wearer. In particular, the progression length of the meridian, as defined above, depends on specific physiological parameters of the wearer and the power variation of the meridian below the near-vision control point is also controlled as a function of the physiological parameters of the wearer.

The progression length can be expressed as follows:

$$PL = H(1 - Ptv_{nv})$$

with H, the near-vision vertical horopter of the wearer; and $Ptv_{nv}$, the coefficient of participation of the head in the lowering of view. This coefficient $Ptv_{nv}$ is equal to the ratio of the elevation of the head to the lowering of view, i.e. $Ptv_{nv} = Hd/(V+B)$ with B, the angle formed by the document containing the point aimed at with the horizontal.

The progression length is then expressed in degrees and corresponds to the elevation of the eyes at the near-vision reference point.

The progression length PL of the meridian on the complex surface of the ophthalmic lens according to the invention thus takes account of the vertical horopter of the wearer in near-vision and his coefficient of participation of the head in near-vision in order to provide him with an optimal visual comfort while allowing him to maintain his natural near-vision posture.

The measurements for implementing the method according to the invention can be carried out as follows.

The environment chosen is a desk environment as represented in FIG. 1. The wearer is positioned at a work table, with a document flat on the table (B=0). He is positioned such that to view the centre of the document he lowers his eyes and his head so that the angle made by the document with the line of view DV is equal to the near-vision vertical horopter H and the document is at a preferred near-vision distance $D_{nv}$ for his eyes. This positioning makes it possible to locate the centre of rotation of the head in the environment. This point is then considered fixed. To describe the view environment, the head of the wearer will turn around this point, the eyes will turn in the head.

For each point aimed at in the environment, the object proximity of this point is known and the requested lowering of view and elevation of the head are measured. From this, the coefficient of participation of the head can be deduced. By the optical optimization methods mentioned previously, it is possible to calculate at each point of the lens, the power required for the wearer to perceive this point clearly, using as target, control of the power progression along the meridian as a function of the physiological parameters measured on the wearer.

Figure 3:
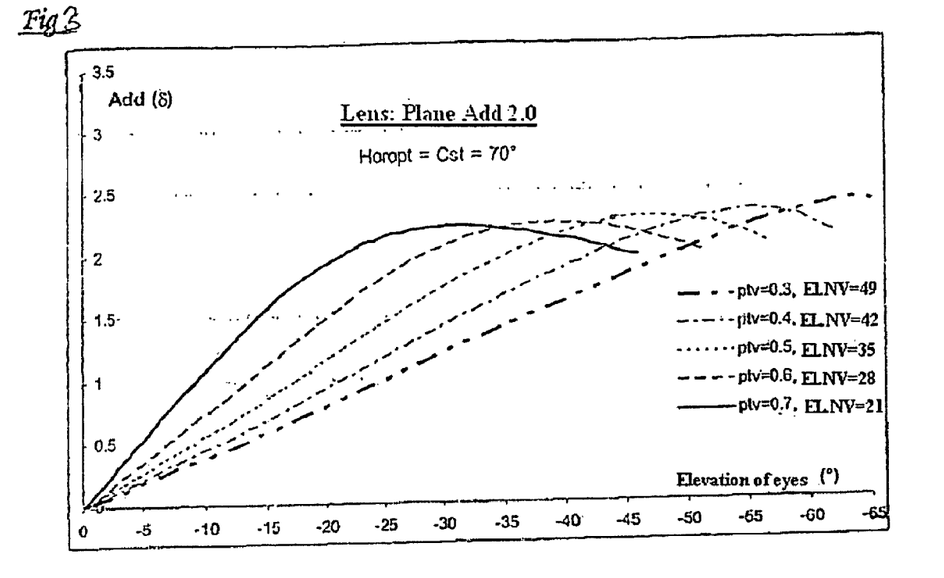
FIG. 3, graphs showing meridian profiles for different coefficients of participation of the head with a constant vertical horopter in near vision.
Figure 4:
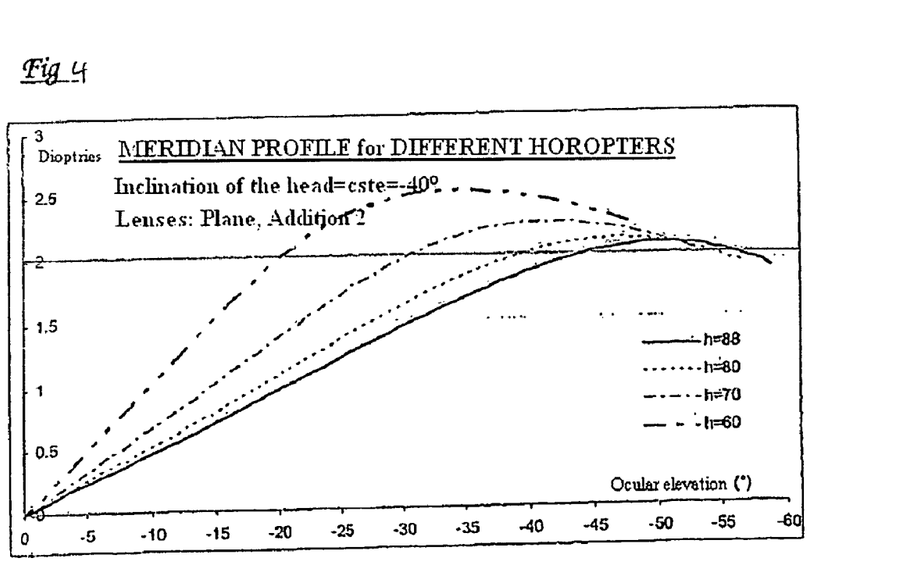
FIG. 4, graphs showing meridian profiles for different values for near-vision vertical horopters with a constant lowering of the head.

FIGS. 3 and 4 represent the optical power along the meridian of a progressive lens with a nominal addition of 2 dioptres. These curves are called progression profiles, meridian profiles or power profiles. On the x-axis, the elevation of the eyes is shown, i.e. the lowering of the eyes behind the lens; and on the y-axis, the optical power perceived by the wearer, the origin being set to the far-vision addition prescribed.

FIG. 3 represents progression profiles for different wearers having the same near-vision vertical horopter of 70° and different vertical coefficients of participation of the head Ptv. Each curve corresponds to a different near-vision elevation of the eyes (El-NV).

It will be noted that although each wearer has the same near-vision vertical horopter, he has a very different elevation behaviour of the head and eyes to achieve the two-dioptre addition prescribed. Thus, one of the wearers will lower his eyes by only 21° to achieve the two-dioptre addition and have a clear near-vision view, and consequently will move his head, while another wearer will only move his head a small amount and will lower his eyes by 49°.

In creating FIG. 4, it is the near-vision elevation of the head which has been maintained constant and equal to 40°, with wearers having different near-vision vertical horopter values.

It is noted that the meridian profile corresponding to the 70° vertical horopter belongs to a subject who in near vision would preferably lower his head by –40° and his eyes by –30° in near vision to achieve the two-dioptre addition. This lowering of the eyes and head do not correspond to any of the profiles of FIG. 3.

This FIG. 4 clearly shows that subjects all having a preferred near-vision elevation of the head of –40° can have different required power profiles as a function of the preferred near-vision lowering of view. As a result, it is necessary to take account of the wearer's near-vision vertical horopter in order to satisfy the needs of different wearers' visual and postural comfort.

Figure 5:
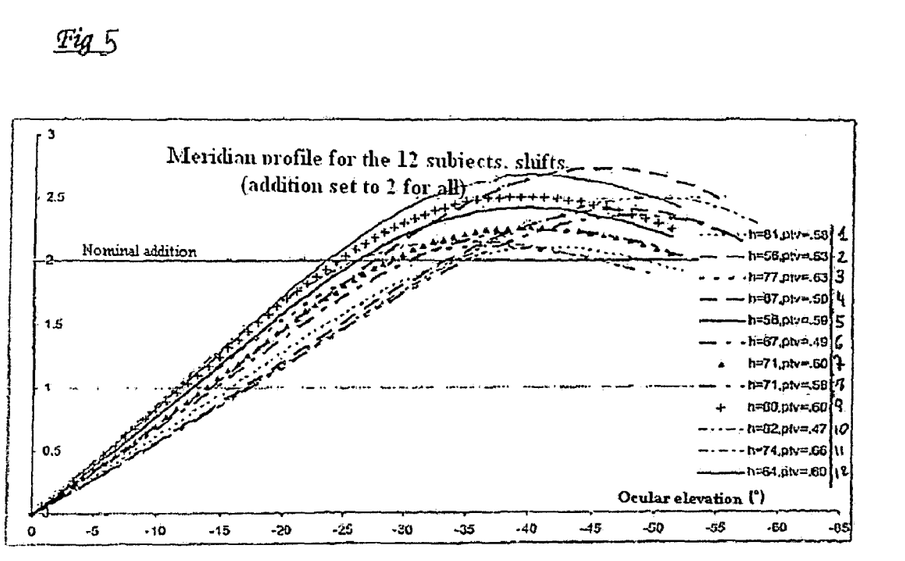
FIG. 5, graphs showing meridian profiles for twelve wearers tested.

In creating FIG. 5, measurements of near-vision posture were taken for twelve different wearers requiring a nominal addition of 2 dioptres.

The table below summarizes the values measured for the preferred near-vision lowering of view (vertical horopter) in degrees, the near-vision vertical coefficient of participation of the head (ptv), the preferred near-vision elevation of the head (head) in degrees and the preferred near-vision elevation of the eyes (eyes) in degrees. The vertical horopter and the elevation of the head or the eyes are measured for each wearer, the near-vision vertical coefficient of participation of the head is then deduced.

| Wearer | Horopter | ptv | Head | Eyes |
| --- | --- | --- | --- | --- |
| 1 | −81.1 | 0.58 | −46.8 | −34.2 |
| 2 | −55.9 | 0.53 | −29.8 | −26.1 |
| 3 | −77.1 | 0.63 | −48.9 | −28.2 |
| 4 | −66.6 | 0.50 | −33.9 | −32.7 |
| 5 | −56.1 | 0.59 | −33.0 | −23.1 |
| 6 | −66.9 | 0.49 | −32.6 | −34.3 |
| 7 | −71.0 | 0.60 | −42.4 | −28.6 |
| 8 | −71.3 | 0.58 | −41.4 | −29.9 |
| 9 | −60.1 | 0.60 | −36.2 | −23.9 |
| 10 | −61.7 | 0.47 | −29.2 | −32.5 |
| 11 | −74.2 | 0.66 | −48.7 | −25.4 |
| 12 | −64.1 | 0.60 | −38.4 | −25.7 |

These measurements show the variability of the vertical horopter value between the different wearers and the absence of a link between this vertical horopter value and the preferred elevation of the head and the eyes in near vision.

FIG. 5 shows the diversity of power profiles required for a same nominal addition. For example, the wearers 5, 9 and 11 have a preferred ocular elevation of the same order of magnitude and relatively small. They therefore require a short progression length. But their different near-vision vertical horopter values involve different required power profiles when the eyes are lowered beyond this value, for example to read the foot of a page of a document.

The present invention therefore proposes to measure the near-vision posture by a suitable device, making it possible, among others, to measure the preferred near-vision lowering of view and at least the preferred near-vision elevation of the head or the preferred near-vision elevation of the eyes. Such a device can comprise a sensor placed on the head of the wearer and an element making it possible to locate the point aimed at, such as a sensor placed on a pointer pen or any device making it possible to measure the rotation of the eyes in their reference.

Apart from the far-vision prescription and the near-vision prescription, these measured physiological parameters are recorded on an order form for a pair of ophthalmic lenses, with or without other variables such as the horizontal coefficient of participation of the head, the lateral shift of the document in near vision, the interpupillary distance of the wearer, the pantoscopic angle of the frame, the lens-eye distance and the size of the frame chosen by the wearer.

Figure 6:
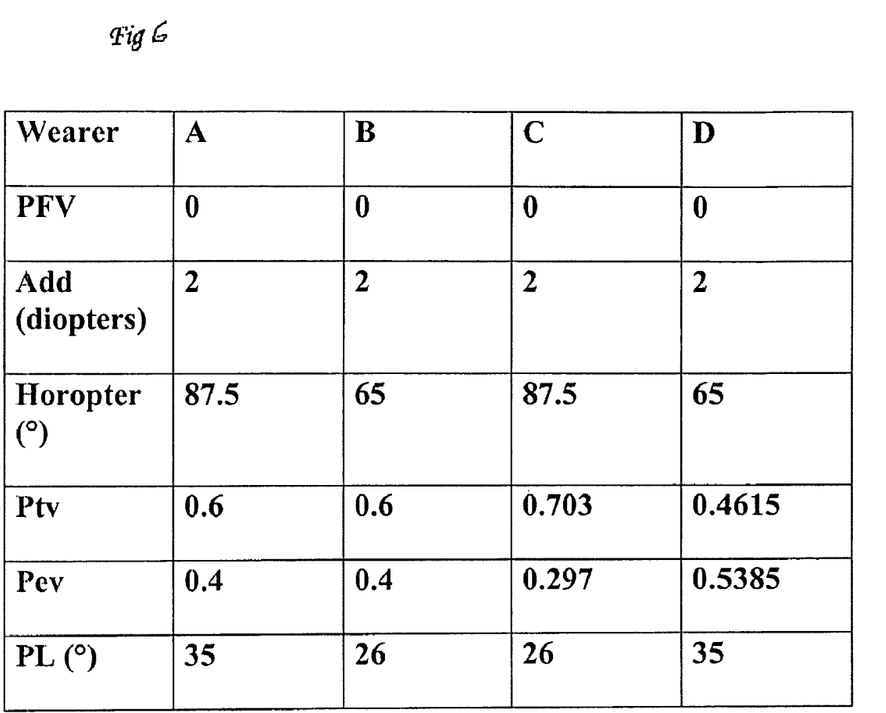
FIG. 6, a table giving the characteristics of four wearers which could be found on a purchase order for lenses determined according to the method of the invention.

FIG. 6 shows examples of a possible such order form for use by an optician. Such an order form would combine the prescribed far-vision power data ($P_{FV}$), the prescribed addition (A), the measured near-vision vertical horopter (H) and lowering of view (V), and the measured near-vision vertical coefficient of participation of the head (Ptv). The near-vision vertical horopter, the lowering of view and the vertical coefficient of participation of the head are measured by the optician or the ophthalmologist by means of the equipment described above. The vertical coefficient of participation of the eyes (Pev) is then deduced as the complement to 1 of the vertical coefficient of participation of the head, and the progression length PL can be calculated according to the relationship PL=H(1−Ptv). For each box on the order form which has not been completed, the standard average value used in existing calculation programs can be retained.

In order to facilitate the comparison, all wearers have the same FV prescription and the same prescribed addition. Only their postural characteristics vary. Two wearers (A and C) have a near-vision vertical horopter of 87.5° and the other 2 (B and D) have a near-vision vertical horopter of 65°. Wearers A and B have a coefficient of participation of the head equal to 0.6, wearer C has a coefficient of participation of the head close to 0.7 and for wearer D, this coefficient is close to 0.46. These values have been measured according to the methods described above, by positioning each wearer in a near-vision document-reading environment and by measuring the average angle by which the head is lowered to scan the document and/or by measuring the average angle by which the eyes are lowered to scan the document; and by measuring the angle formed by the document with a horizontal plane. These measurements make it possible to determine for each wearer his required progression length PL.

Each copy of these order forms informs the calculation program by optical optimization in order to calculate the pair of lenses and to produce the manufacturing order which controls the direct manufacturing machine.

The lenses thus manufactured will make it possible to conform to the natural posture of the wearer, thus offering him a greater visual and postural comfort.

Figure 7A:
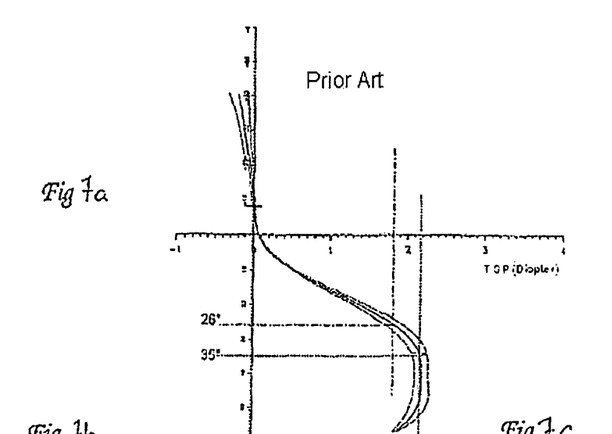
FIGS. 7a to 7e, meridian profiles for a lens of the prior art and for lenses corresponding to the prescriptions of the examples in FIG. 6.
Figure 7B:
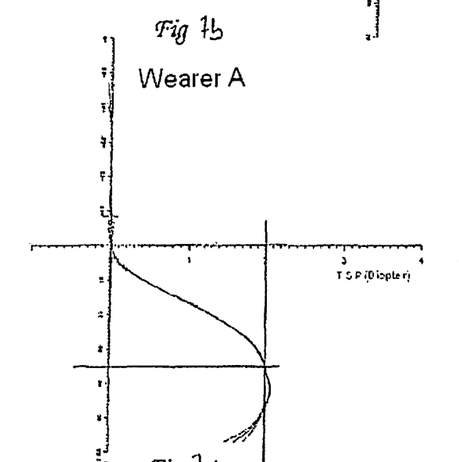
Figure 7C:
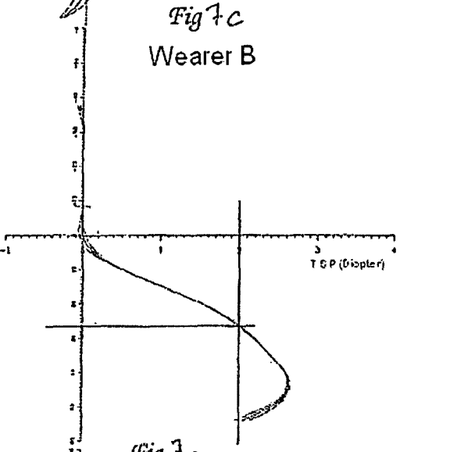
Figure 7D:
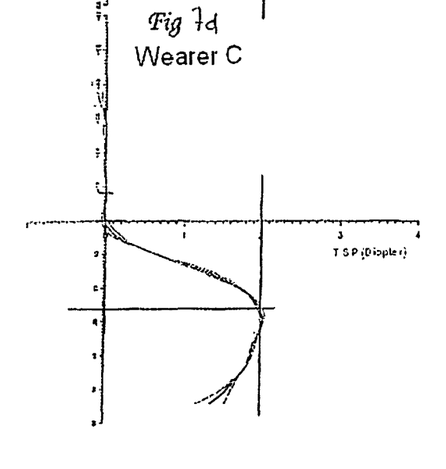

FIGS. 7a to 7e represent meridian profiles. FIG. 7a corresponds to a lens of the prior art, in particular a lens marketed by the Applicant under the trade mark Varilux Comfort®. FIGS. 7b to 7d correspond to lenses obtained according to the method of the invention and corresponding respectively to wearers A, B, C and D of the prescriptions shown in the table in FIG. 6. FIGS. 8a to 8b and 9a to 9d represent the optical characteristics of the lenses of FIGS. 7a to 7d; i.e. wearer power maps for the series of FIG. 8 and resulting astigmatism maps for the series of FIG. 9.

FIG. 7a shows, for comparison, the power defects caused by the lens of the prior art if these wearers do not modify their postural behaviour. The lens of FIG. 7a in fact corresponds to a general-purpose lens determined from average standard values.

Figure 7E:
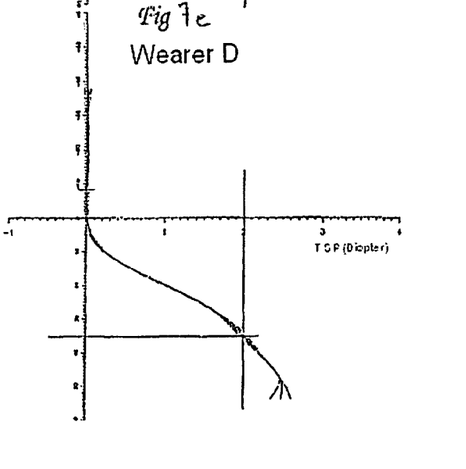
Figure 8A:
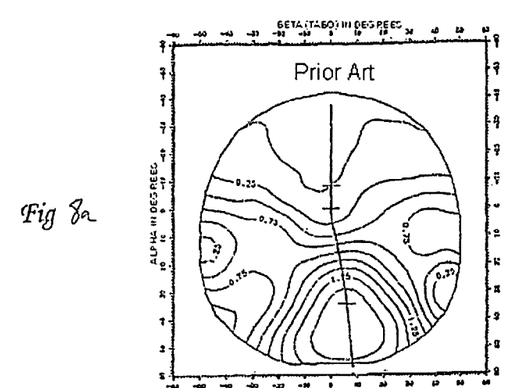
FIGS. 8a to 8e, wearers' power maps for a lens of the prior art and for the lenses corresponding to the prescriptions of the examples in FIG. 6.
Figure 8B:
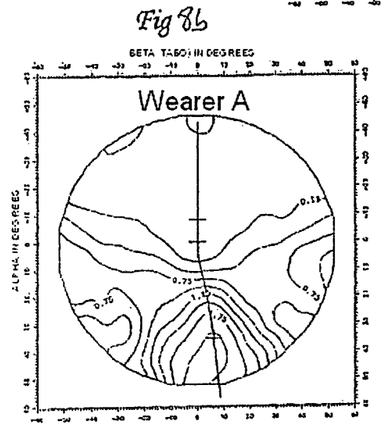
Figure 8C:
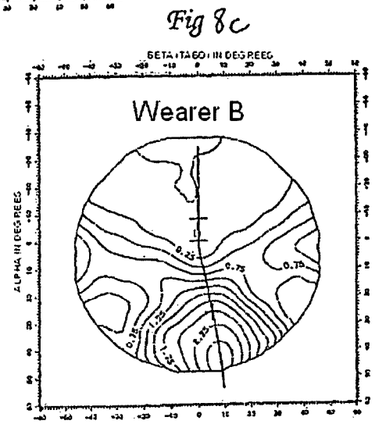
Figure 8D:
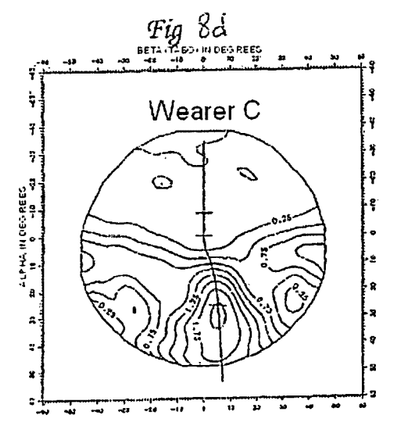
Figure 8E:
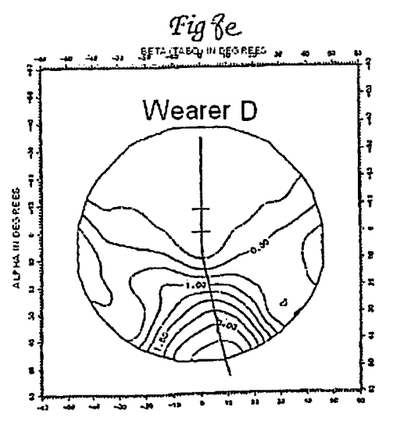

FIGS. 7b to 7c, corresponding to the embodiments according to the invention, show that the addition prescribed is indeed reached at −35° of ocular elevation for wearers A and D (FIGS. 7b and 7e) and at 26° for wearers B and C (FIGS. 6c and 6d). Moreover, as wearers A and C have a near-vision vertical horopter close to 90°, the distance to the document varies very little when they lower their head and eyes to scan the document front top to bottom. The power required around the point NV therefore varies very little (FIGS. 7b and 7d). On the other hand, for wearers B and D who have a small near-vision vertical horopter value and far from 90°, reading the document from top to bottom results in a variation of the distance of the eyes from the document due to a lowering of the head. The power required for these wearers therefore increases below the point NV; from 0.04 dioptre per degree on average between 26 and 42° for wearer B, reaching 2.63 dioptres at 42° (FIG. 7c) and 0.037 dioptre per degree between 35 and 49°, reaching 2.50 dioptres at approximately 50° for wearer D (FIG. 7e).

The power variation along the meridian on the lenses obtained with the method of the invention is therefore controlled as a function of the lowering of the eyes E and the distance of the object point aimed at, which depend on the value for the near-vision lowering of view V—or the near-vision vertical horopter measured on said wearer—and the participation of the eyes and/or the head of said wearer in the near-vision lowering of view. The power variation along the meridian for a lens personalized to the needs of a given wearer as proposed by the invention, therefore has a controlled and personalized progression length, as well as a controlled and personalized power variation below the near-vision reference point.

Thus, for a wearer having a near-vision vertical horopter close to 90°, the distance to the document varies very little when he lowers his head and eyes to scan the document from top to bottom; the progressive lens will thus have a progression meridian with a zero derivative for a lowering of view comprised between 85° and 90° (FIGS. 7b and 7d). Similarly, for a wearer having a small near-vision vertical horopter and far from 90°, reading the document from the top to the bottom involves a variation in the distance of the eyes to the document due to a lowering of the head; the optical power along the progression meridian of the lens will increase beyond the near-vision reference point for a lowering of view less than 85° (FIGS. 7c and 7e). A wearer will thus position his document differently according to his near-vision vertical horopter; the top of the document will be further from the centre of rotation of the head for a wearer with a small vertical horopter than for a wearer with a vertical horopter close to 90°.

It will also be noted on FIGS. 8a to 8e that the optical power variation is approximately symmetrical with respect to the meridian, regardless of the meridian profile considered. Positional variations of this meridian can be noted as a function of the progression length (FIGS. 8b and 8d) and, for a given progression length, as a function of the near-vision vertical horopter of the wearer. These positional differences of the meridians of the different lenses given by way of example are particularly visible below the near-vision reference point NV (FIGS. 8c and 8d) due to the reduction in the distance of the eyes from the document caused by the lowering of the head in the case of a low-value near-vision vertical horopter.

Figure 9A:
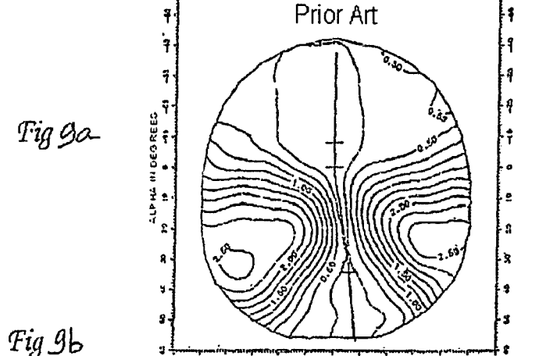
FIGS. 9a to 9e, resulting astigmatism [maps] for a lens of the prior art and for the lenses corresponding to the prescriptions of the examples in FIG. 6.
Figure 9B:
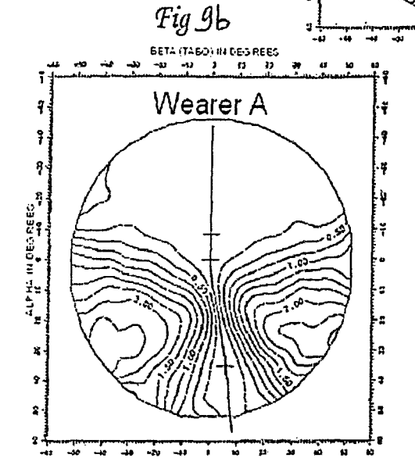
Figure 9C:
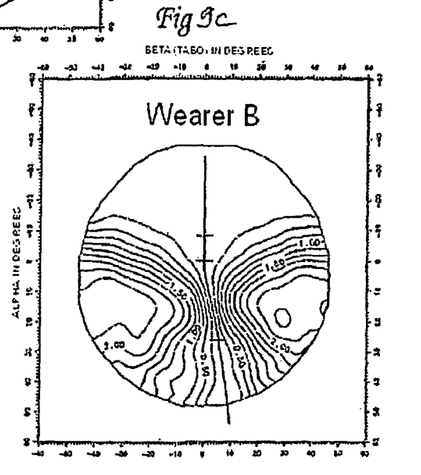
Figure 9D:
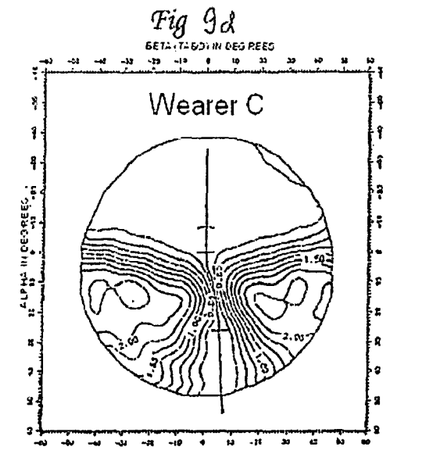
Figure 9E:
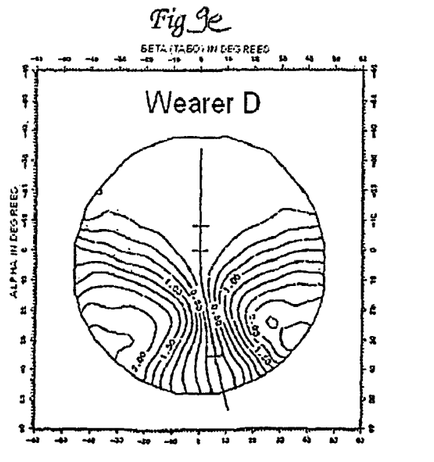

Moreover, the resulting astigmatism (FIGS. 9a to 9c) defines a near-vision corridor which increases in size as the power along the meridian varies more gradually (FIGS. 9b and 9d). For these embodiments, the distribution of the resulting astigmatisms is equally as symmetrical with respect to the meridian as for the lens of the prior art, but a very clear open far-vision zone and a lower maximum value for the maximum astigmatism were favoured in comparison with the prior art in order to improve the overall comfort for the wearers, whatever their postural characteristics.

The method of the invention therefore makes it possible to determine a progressive ophthalmic lens by optical optimization by using as target a controlled power variation along the principal progression meridian; this power variation on the meridian depends on physiological parameters of the near-vision wearer measurements. The lens according to the invention thus obtained, therefore better satisfies the needs of the wearer and provides him with better visual comfort.

The invention claimed is:

1. Method determining a progressive ophthalmic lens for a given wearer to whom a near-vision power addition (A) has been prescribed, the lens having a fitting cross marking the primary direction of view under wearing conditions, and a principal progression meridian between a far-vision zone and near-vision zone, the method comprising the steps of:
   measuring the lowering of view (V) of the wearer on a near-vision point aimed at;
   measuring a near-vision vertical horopter (H) as the angle made by the lowering of view (V) with a document containing the point aimed at, said document forming an angle (B) with the horizontal;
   measuring the near-vision elevation of the head (Hd) and/or the elevation of the eyes (E) of the wearer;
   determination of a near-vision vertical coefficient of participation of the head ($Ptv_{nv} = Hd(V+B)$);
   determination of a progression length (PL) specific to the wearer, defined by the relationship $PL = H(1 - Ptf_{nv})$, the progression length being defined as the angle of lowering of the eyes between the fitting cross (FC) and the point of the meridian for which the power reached the power addition (A);
   determination of the lens by optimization by optical calculation under wearing conditions, by using as target a power variation along the meridian with a progression length equal to said progression length specific to the wearer.

2. The method of claim 1, in which the step of measuring the lowering of view comprises the steps of:
   positioning the wearer reading a document in near vision;
   measuring the average angle by which the head is lowered to scan the document and/or measuring the average angle by which the eyes are lowered to scan the document;
   identification of the point aimed at by the wearer;
   measuring the angle formed between a horizontal plane of the space and the plane containing the point aimed at and the centres of rotation of the eyes.

3. The method of claim 1, in which the step of measuring the lowering of view and the step of measuring the vertical horopter are combined, the document containing the point aimed at by the wearer being positioned flat on a horizontal support.

4. The method of claim 2, in which the step of measuring the lowering of view and the step of measuring the vertical horopter are combined, the document containing the point aimed at by the wearer being positioned flat on a horizontal support.

5. Progressive ophthalmic lens personalized to the needs of a given wearer, the lens having a fitting cross (FC) marking the primary direction of view under wearing conditions and an approximately umbilical progression meridian having a power addition (A) between a far-vision (FV) control point and a near-vision (NV) control point; the lens having under wearing conditions, a optical power controlled along the meridian with a progression length as defined as the vertical distance between the fitting cross (FC) and the point of the meridian for which the power reached the addition (A), said progression length of said personalized lens being determined by the following relationship:

$PL = H(1 - Ptv_{nv})$;

with H, the vertical horopter of said wearer in near-vision;
and $Ptv_{nv}$, the vertical coefficient of participation of the head of said wearer in near-vision.

6. The personalized progressive ophthalmic lens of claim 5, in which the progression meridian has a zero derivative for a lowering of view of said wearer comprised between 85° and 90°.

7. The personalized progressive ophthalmic lens of claim 5, for which the optical power along the progression meridian increases beyond the near-vision reference point for a lowering of view of said wearer less than 85°.

8. A visual device comprising at least one progressive ophthalmic lens personalized to the needs of a given wearer, the lens having a fitting cross (FC) marking the primary direction of view under wearing conditions and an approximately umbilical progression meridian having a power addition (A) between a far-vision (FV) control point and a near-vision (NV) control point; the lens having under wearing conditions, a optical power controlled along the meridian with a progression length defined as the vertical distance between the fitting cross (FC) and the point of the meridian for which the power reaches the addition (A), said progression length of said personalized lens being determined by the following relationship:

$PL=H(1-Ptvnv)$;

with H, the vertical horopter of said wearer in near-vision; and $Ptv_{nv}$, the vertical coefficient of participation of the head of said wearer in near-vision.

9. The visual device of claim 8, wherein the progression meridian of the progressive lens has a zero derivative for a lowering of view of said wearer comprised between 85° and 90°.

10. The visual device of claim 8, wherein the progression meridian of the progressive lens increases beyond the near-vision reference point for a lowering of view of said wearer less than 85°.

* * * * *